United States Patent
Liu et al.

(10) Patent No.: US 12,455,192 B2
(45) Date of Patent: Oct. 28, 2025

(54) SOLAR REFLECTION FULL-BAND HYPERSPECTRAL IMAGING DETECTION SYSTEM

(71) Applicant: Shanghai Institute of Technical Physics, Chinese Academy of Sciences, Shanghai (CN)

(72) Inventors: Yinnian Liu, Shanghai (CN); Zongcun Zhang, Shanghai (CN); Rongjie Qin, Shanghai (CN); Dexin Sun, Shanghai (CN); Yun Zhao, Shanghai (CN); Youlong Ke, Shanghai (CN)

(73) Assignee: Shanghai Institute of Technical Physics, Chinese Academy of Sciences, Shanghai (CN)

( * ) Notice: Subject to any disclaimer, the term of this patent is extended or adjusted under 35 U.S.C. 154(b) by 127 days.

(21) Appl. No.: 18/406,082

(22) Filed: Jan. 5, 2024

(65) Prior Publication Data
US 2024/0142305 A1 May 2, 2024

Related U.S. Application Data

(63) Continuation of application No. PCT/CN2023/073939, filed on Jan. 31, 2023.

(30) Foreign Application Priority Data

Feb. 10, 2022 (CN) .......................... 202210123382.1

(51) Int. Cl.
*G01J 3/28* (2006.01)
*G01J 3/02* (2006.01)
*G01J 3/18* (2006.01)

(52) U.S. Cl.
CPC ............. *G01J 3/2823* (2013.01); *G01J 3/021* (2013.01); *G01J 3/18* (2013.01); *G01J 2003/2826* (2013.01)

(58) Field of Classification Search
CPC .......... G01J 3/0294; G01J 3/2823; G01J 3/36; G01J 2003/2826
See application file for complete search history.

(56) References Cited

U.S. PATENT DOCUMENTS

2011/0109903 A1* 5/2011 Lee ........................ G01J 3/02
356/303
2014/0071449 A1 3/2014 Robinson et al.

FOREIGN PATENT DOCUMENTS

| CN | 108801460 A | 11/2018 |
|---|---|---|
| FR | 2970075 A1 | 7/2012 |

OTHER PUBLICATIONS

Liu, Yinnian et al, "Development of visible and short-wave infrared hyperspectral imager onboard GF-5 satellite," Journal of Remote Sensing (Chinese), vol. 24(4), pp. 333-344 (2020).

(Continued)

*Primary Examiner* — Thanh Luu
(74) *Attorney, Agent, or Firm* — Mei & Mark LLP; Manni Li

(57) ABSTRACT

A solar reflection full-band hyperspectral imaging detection system comprises a telescope light collection system, a field-of-view separation assembly, a spectrometer assembly, and a detector assembly. The field-of-view separation assembly comprises an integrated trisection field-of-view separator, a first field-of-view assembly, a second field-of-view assembly, and a third field-of-view assembly; the spectrometer assembly comprises a first spectrometer, a second spectrometer and a third spectrometer; and the detector assembly comprises a CMOS (Complementary Metal Oxide Semiconductor) detector, an InGaAs detector, and an HgCdTe detector. The present invention adopts the three-band spectrometer, and the spectrum aliasing, high photoelectric efficiency in the middle and low photoelectric efficiency at two ends, limited detection dynamic range, (Continued)

severe Etalon interference effect and the like of a two-band spectrometer with a traditional solar reflection full-band hyperspectral detection system are solved.

17 Claims, 12 Drawing Sheets

(56) References Cited

OTHER PUBLICATIONS

Duan, Weibo et al., "Design and fabrication of an integrated order blocking filter for hyperspectral imaging system," Journal of Infrared Millim. Waves, vol. 35, No. 6, pp. 430-434 (Aug. 2016).

* cited by examiner

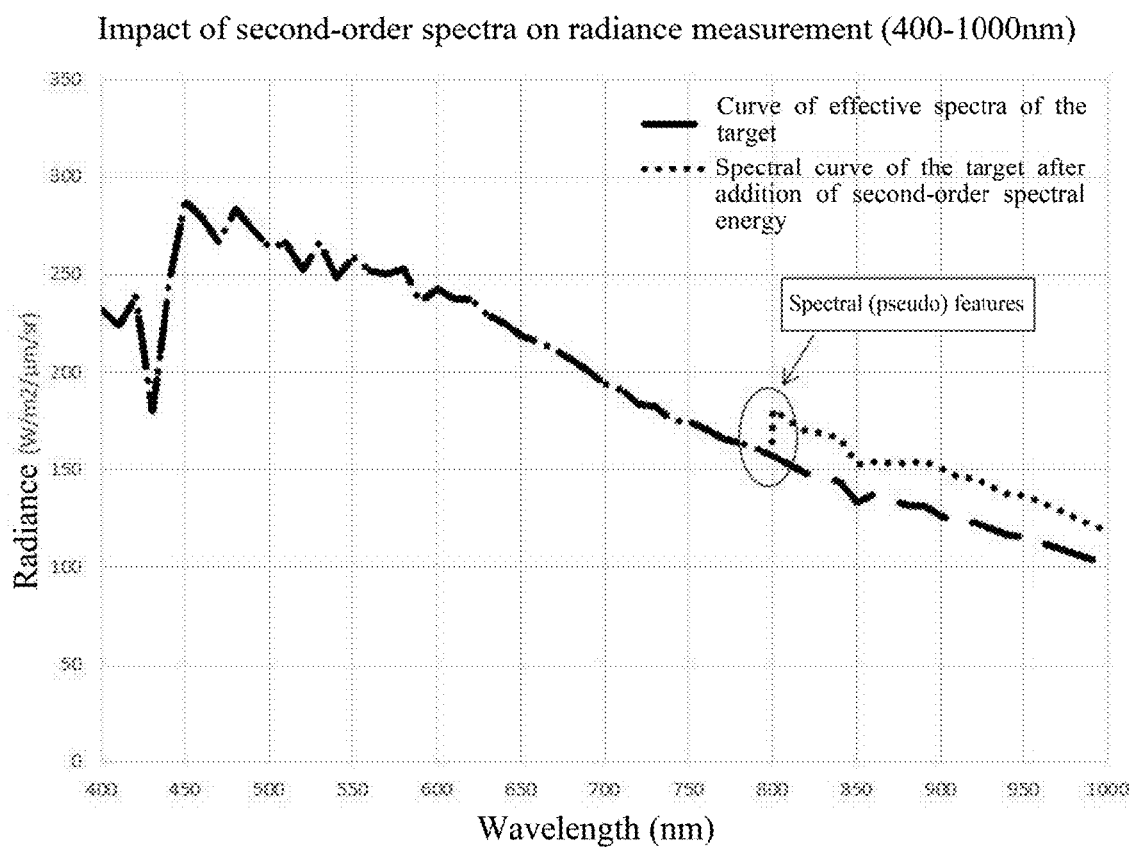
FIG. 1 -- Prior Art --

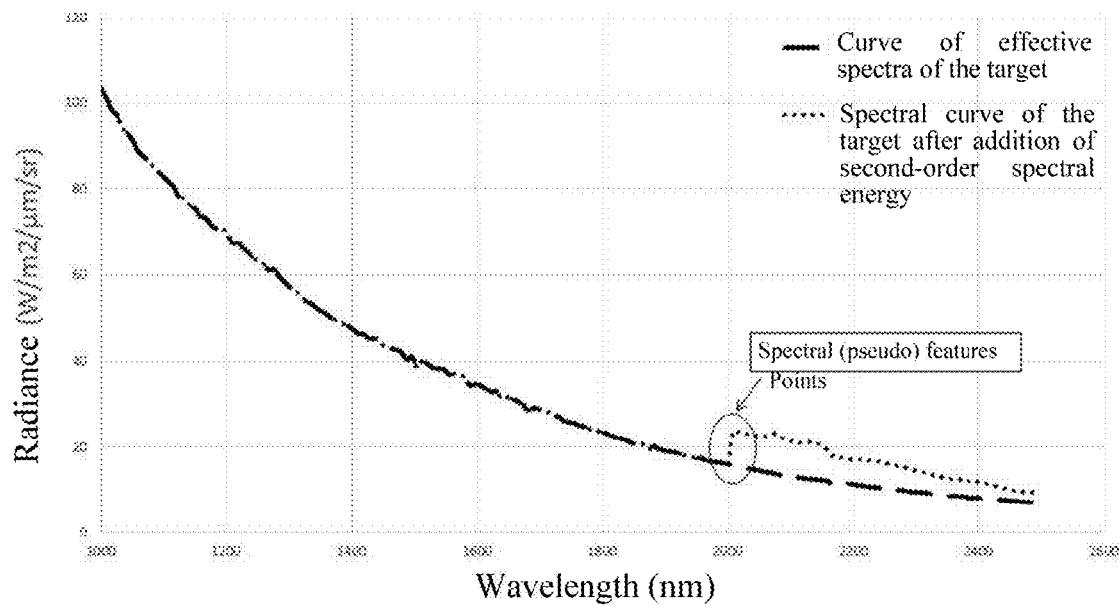
FIG.2 -- Prior Art --
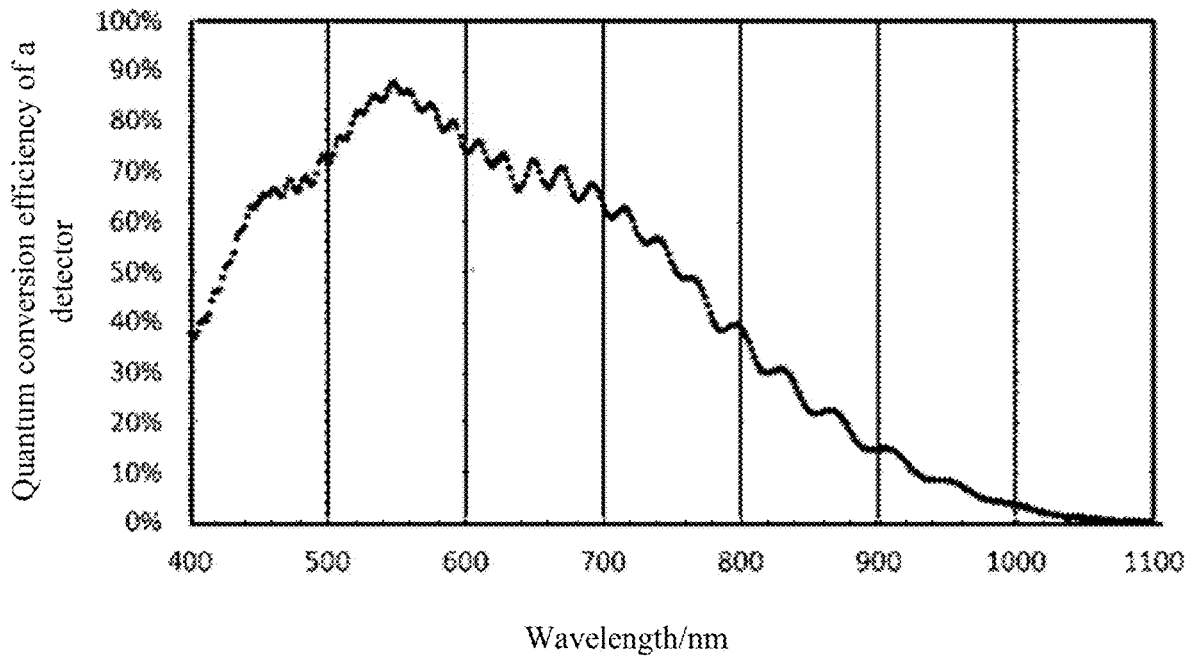
FIG.3 -- Prior Art --

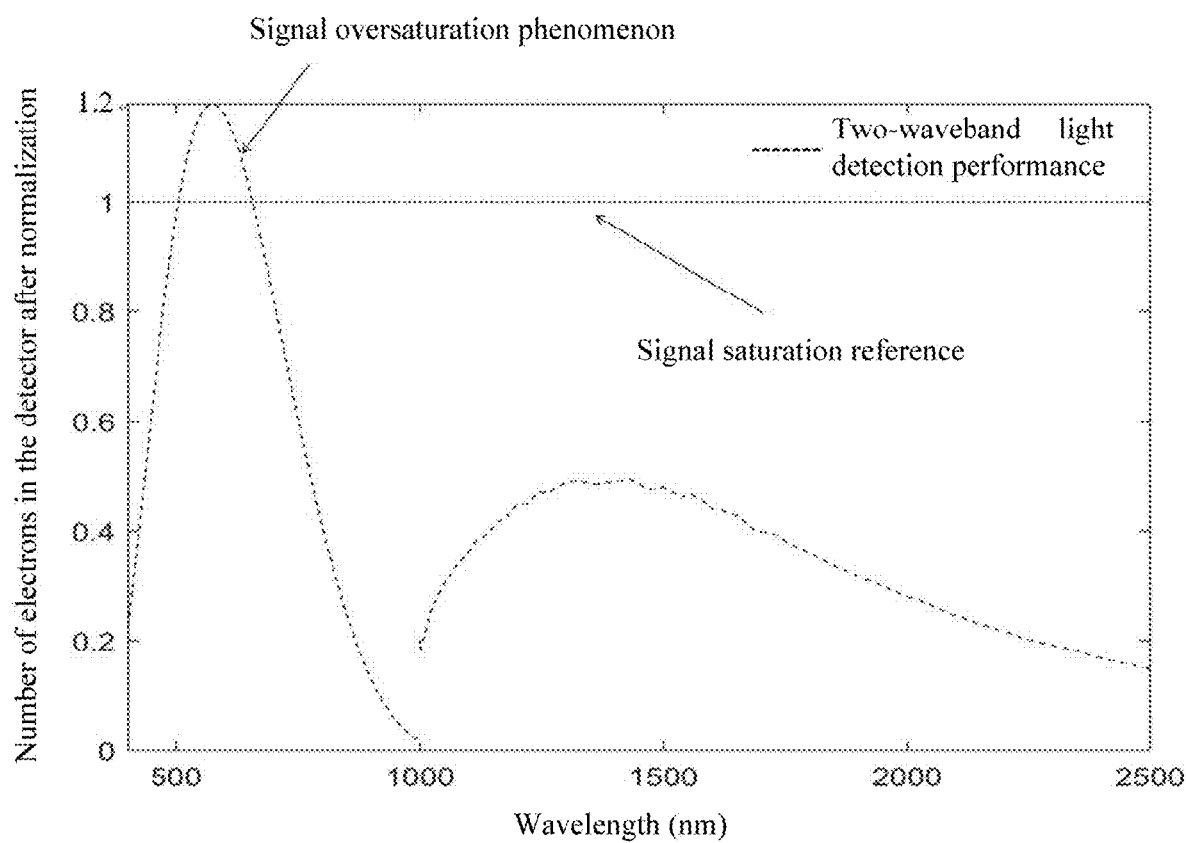
FIG. 4 -- Prior Art --

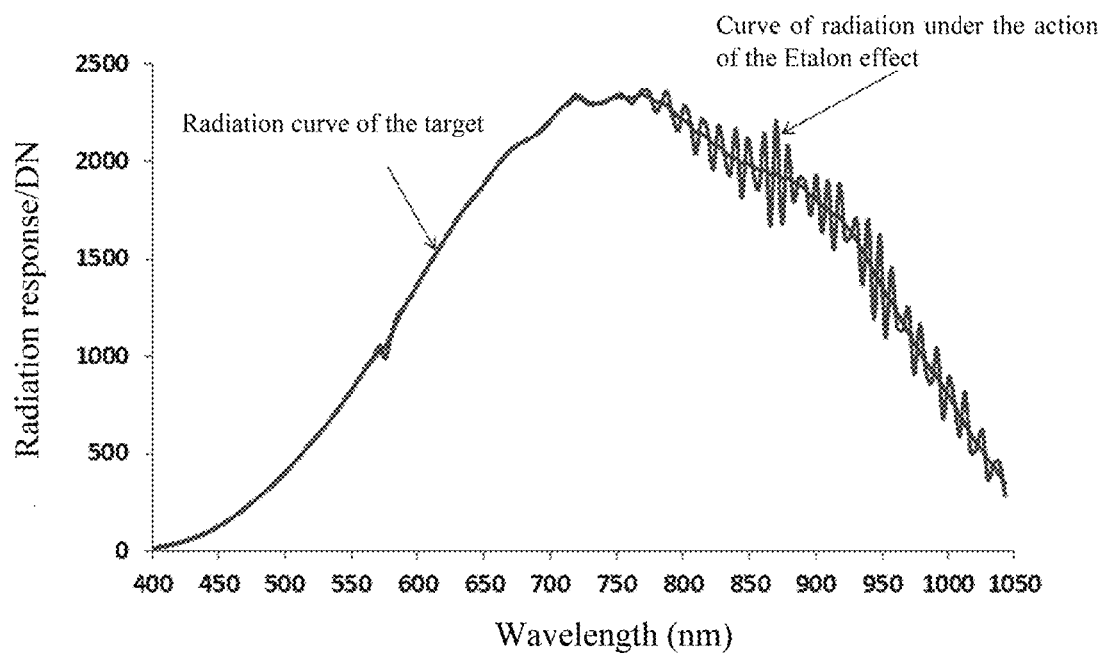
FIG. 5A -- Prior Art --
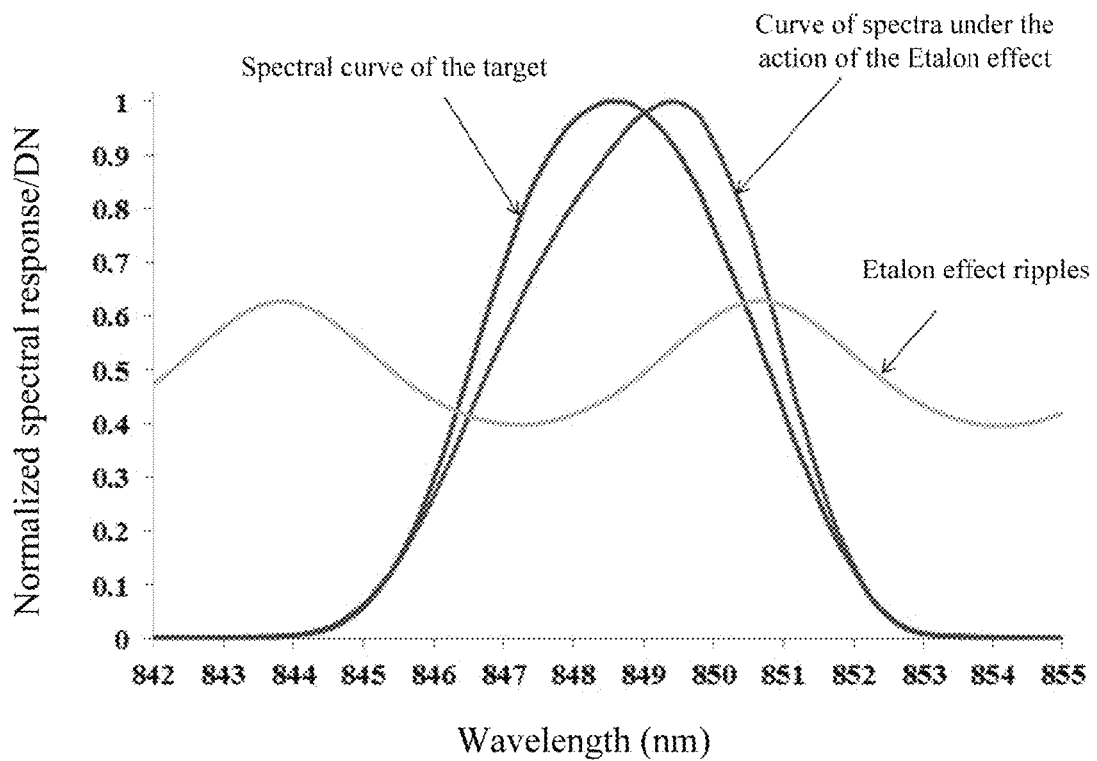
FIG. 5B -- Prior Art --

SOLAR REFLECTION FULL-BAND HYPERSPECTRAL IMAGING DETECTION SYSTEM

CROSS-REFERENCE TO RELATED APPLICATIONS

The subject application is a continuation of PCT/CN2023/073939 filed on Jan. 31, 2023, which in turn claims priority on Chinese Patent Application No. CN202210123382.1 filed on Feb. 10, 2022 in China. The contents and subject matters of the PCT international stage application and Chinese priority application are incorporated herein by reference.

TECHNICAL FIELD

The present invention relates to the technical field of hyperspectral imaging, and particularly, a high-efficiency hyperspectral resolution imaging detection system and mechanism which greatly improve the detection range, sensitivity, and precision within a full-band range of solar reflection.

BACKGROUND ART

A full band (0.4 μm-2.5 μm) solar reflection covers almost all wavelengths reflecting the reflection characteristics of the target, which plays an important role in ecological environment monitoring, surveys on land resources and geological minerals, disaster monitoring, fine operations in agriculture, forestry, animal husbandry, and urban planning. Hyperspectral imaging technology is a remote sensing technology developed in the 1980s. Different from traditional spectrometers, the hyperspectral imaging technology integrates images and spectra (image-spectrum merging). Due to the nanoscale hyperspectral resolution, continuous and fine spectral information of the target is acquired simultaneously while two-dimensional spatial image information of the target is obtained, which greatly improves the detection capacity of spatial remote sensing. A traditional full band of solar reflection divides a detection band into a visible and near-infrared (VNIR, 0.4 μm-1.0 μm) band and a short-wave infrared (SWIR, 1.0 μm-2.5 μm) band, and two spectrometers are used to focus the VNIR (0.4 μm-1.0 μm) band on a CCD (Charge Coupled Device) or CMOS (Complementary Metal-Oxide Semiconductor) detector for imaging, and to focus the SWIR (1.0 μm-2.5 μm) band on an HgCdTe detector for imaging. Due to nonlinearity of interference or prismatic decomposition, the spectral width difference in a single pixel of the spectral dimension can reach several times or more in a wide range of wavelengths, resulting in that the dynamic range of the system is significantly narrowed and the small-signal detection capacity is seriously limited. The linear characteristics of the grating beam splitting can effectively improve the above deficiencies, but due to the basic principle of grating dispersion, the grating beam splitting method causes the problem of overlapping diffracted beams of different orders.

The grating equation is as follows: $d \sin \theta = k\lambda$.

Under the premise that the grating constant d and the diffraction angle θ are determined, the k-order light with the wavelength λ and the 2k-order light with the wavelength λ/2 are indistinguishable due to overlapping of spatial positions, thus resulting in spectral aliasing. The traditional solar reflection full-band hyperspectral imager is actually measured at a solar elevation angle of 60° and an albedo of 50%, and it can be seen that the position of the second-order diffraction spectrum from 0.4 μm to 0.5 μm coincides with that of the first-order diffraction spectrum from 0.8 μm to 1.0 μm, and spectral (pseudo) features appear, exceeding normal values by 15%, as shown in FIG. 1. In a short-wave spectrometer, there also exists an obvious aliasing effect of a 1.0 μm-1.25 μm second-order diffraction spectrum at the position of a 2.0 μm-2.5 μm first-order diffraction spectrum, and the spectral (pseudo) features appear, exceeding the normal values by nearly 50%, as shown in FIG. 2. The traditional imaging spectroscopy system based on linear dispersion of grating generally has the problem of secondary spectral aliasing, and the amplitude of aliasing far exceeds the accuracy 1% of radiometric measurement. At present, the widely used method of optical filtering a non-measured sub-spectrum is to arrange a positioned optical filter in front of a detector. However, additional increase of the optical filter affects the overall transmittance, and the installation deviation of the filter results in serious inconsistency of the response characteristics of the transition zone pixels.

In addition, when the traditional solar reflection full-band hyperspectral imager directly focuses the VNIR (0.4 μm-1.0 μm) band on the CCD or CMOS detector through grating beam splitting, in order to take into account and improve the quantum efficiency at both ends of a broadband as much as possible, the quantum conversion efficiency of the detector approaches 90% at around 550 nm. However, with the broadening of a band, it is still difficult to guarantee the quantum efficiency of photoelectric conversion at both ends, and the phenomenon of high efficiency in the middle and low efficiency at both ends occurs. In particular, the quantum efficiency of the NIR (0.8 μm-1.0 μm) band is reduced to 3%-40%, as shown in FIG. 3. The target energy received at both ends of the band is significantly lower than that in the middle thereof, resulting in that the detection signal-to-noise ratio at both ends of the band is too low, while in the range of 0.5 μm-0.65 μm, the problem of spectral channel signal oversaturation may easily occur, as shown in FIG. 4. Under the traditional system, in order to improve the phenomenon that the spectral response of the detector is low at both ends, substrate of the detector needs to be thinned, but a severe Etalon effect is introduced when the response is improved, as shown in FIGS. 5A and 5B. The Etalon effect seriously reduces the radiation (FIG. 5A) and spectral (FIG. 5B) response accuracy of the system, and with further improvement of the spectral resolution, the problems caused by the Etalon effect become more prominent, thus seriously affecting the radiation and spectral quantification levels of the system. In the existing technology, a post-correction method is usually used to deal with interference ripples generated by the Etalon effect. However, the problems such as process error and wavelength drift exist in practical engineering applications, and it is hard to completely eliminate the Etalon effect through the correction method. In conclusion, the traditional solar reflection full-band hyperspectral imager hardly meets the requirement for both high response in a full-band range and a large dynamic range in terms of system and mechanism, which seriously affects the quantitative accuracy at a high spectral resolution.

SUMMARY OF INVENTION

The present invention changes the two-band method usually adopted for the traditional solar reflection full-band hyperspectral detection system and provides a new solar reflection full-band hyperspectral imaging detection system that expands the detection range and improves the signal-to-noise ratio and detection accuracy. The three-band spectrometer of the present invention solves the problems of the traditional solar reflection full-band hyperspectral detection system including spectral aliasing and high efficiency in the middle and low efficiency at both ends, so that the optical efficiency and detector efficiency of the hyperspectral detection system are optimized, the Etalon effect is eliminated fundamentally, and detection with high efficiency and high spectral resolution in the solar reflection full-band range is made possible.

Therefore, the present invention employs the following technical solution:

a solar reflection full-band hyperspectral imaging detection system, comprising a telescope light collection system 1, a field-of-view separation assembly 2, a spectrometer assembly 3, and a detector assembly 4, where the field-of-view separation assembly 2 comprises an integrated trisection field-of-view separator 2-1, a first field-of-view assembly 2-2, a second field-of-view assembly 2-3 and a third field-of-view assembly 2-4; the spectrometer assembly 3 comprises a first spectrometer 3-1, a second spectrometer 3-2, and a third spectrometer 3-3; and the detector assembly 4 comprises a CMOS (Complementary Metal Oxide Semiconductor) detector 4-1, an InGaAs detector 4-2, and an HgCdTe detector 4-3.

In the solar reflection full-band hyperspectral imaging detection system of the present invention, after the light from a target is collected by the telescope light collection system 1, three rays of light are formed through the integrated trisection field-of-view separator 2-1, where a first waveband light with a wavelength range of $\lambda_1$-$\lambda_2$ is formed after one ray of light passes through the first field-of-view assembly 2-2, a second waveband light with a wavelength range of $\lambda_3$-$\lambda_4$ is formed after one ray of light passes through the second field-of-view assembly 2-3, and a third waveband light with a wavelength range of $\lambda_5$-$\lambda_6$ is formed after one ray of light passes through the third field-of-view assembly 2-4; the first waveband light is focused and imaged on the CMOS detector 4-1 after beam splitting through the first spectrometer 3-1, the second-waveband light is focused and imaged on the InGaAs detector 4-2 after beam splitting through the second spectrometer 3-2, and the third-waveband light is focused and imaged on the HgCdTe detector 4-3 after beam splitting through the third spectrometer 3-3, where $\lambda_1 < \lambda_3 \leq \lambda_2 < \lambda_5 \leq \lambda_4 < \lambda_6$, and the minimum wavelength in each wavelength range is not less than half of the maximum wavelength, that is, $\lambda_2 < 2\lambda_1$, $\lambda_4 < 2\lambda_3$, and $\lambda_6 < 2\lambda_5$; the overlapping wavelength of the second waveband light is located in a high quantum efficiency region of the CMOS detector 4-1, the overlapping wavelength of the third waveband light is located in a high quantum efficiency region of the InGaAs detector 4-2, and the continuous high quantum efficiency detection in a range of $\lambda_1$-$\lambda_6$ from the first waveband light to the third waveband light is realized.

In the present invention, the integrated trisection field-of-view separator 2-1 comprises a trapezoid-like primary prism 2-1-1, and a first reflecting mirror 2-1-2 and a second reflecting mirror 2-1-3 located on both sides of the primary prism 2-1-1, where a light path 2-1-4 is arranged at the center of the primary prism. After the light of the target is collected through the telescope light collection system 1, a ray of light is formed through the light path 2-1-4 of the primary prism 2-1-1, a ray of light is formed after reflection through the first reflecting mirror 2-1-2, and another ray of light is formed after reflection through the second reflecting mirror 2-1-3.

The first field-of-view assembly 2-2 comprises a slit dustproof protection sheet 2-2-1 coated with a layer of front cut-off filter coating with a wavelength of $\lambda_1$, a long slit target 2-2-2 with a wedge angle, and a slit dustproof protection sheet 2-2-3 coated with a layer of rear cut-off filter coating with a wavelength of $\lambda_2$; the ray of light formed through the light path 2-1-4 of the primary prism 2-1-1 sequentially passes through the slit dustproof protection sheet 2-2-1 coated with a layer of front cut-off filter coating with a wavelength of $\lambda_1$, the long slit target 2-2-2 with a wedge angle, and the slit dustproof protection sheet 2-2-3 coated with a layer of rear cut-off filter coating with a wavelength of $\lambda_2$ to obtain the first waveband light with a wavelength range of $\lambda_1$-$\lambda_2$.

In the present invention, the second field-of-view assembly 2-3 comprises a slit dustproof protection sheet 2-3-1 coated with a layer of front cut-off filter coating with a wavelength of $\lambda_3$, a long slit target 2-3-2 with a wedge angle, and a slit dustproof protection sheet 2-3-3 coated with a layer of rear cut-off filter coating with a wavelength of $\lambda_4$; the ray of light formed after reflection through the first reflecting mirror 2-1-2 sequentially passes through the slit dustproof protection sheet 2-3-1 coated with a layer of front cut-off filter coating with a wavelength of $\lambda_3$, the long slit target 2-3-2 with a wedge angle, and the slit dustproof protection sheet 2-3-3 coated with a layer of rear cut-off filter coating with a wavelength of $\lambda_4$ to obtain the second waveband light with a wavelength range of $\lambda_3$-$\lambda_4$.

In the present invention, the third field-of-view assembly 2-4 comprises a slit dustproof protection sheet 2-4-1 coated with a layer of front cut-off filter coating with a wavelength of $\lambda_5$, a long slit target 2-4-2 with a wedge angle, and a slit dustproof protection sheet 2-4-3 coated with a layer of rear cut-off filter coating with a wavelength of $\lambda_6$; the ray of light formed after reflection through the second reflecting mirror sequentially passes through the slit dustproof protection sheet 2-4-1 coated with a layer of front cut-off filter coating with a wavelength of $\lambda_5$, the long slit target 2-4-2 with a wedge angle, and the slit dustproof protection sheet 2-4-3 coated with a layer of rear cut-off filter coating with a wavelength of $\lambda_6$ to obtain the second waveband light with a wavelength range of $\lambda_5$-$\lambda_6$.

In the present invention, the first spectrometer 3-1, the second spectrometer 3-2, and the third spectrometer 3-3 are all grating-based spectrometers, and the grating-based spectrometer structure comprises a first concave spherical mirror, a convex diffraction grating, a second concave spherical mirror, and a plane transition mirror; the first waveband light is reflected to the convex diffraction grating 3-1-2 through the first concave spherical mirror 3-1-1 of the first spectrometer 3-1, then transmitted to the second concave spherical mirror 3-1-3 after fine beam splitting through the convex diffraction grating 3-1-2, further reflected to the plane transition mirror 3-1-4, and finally focused and imaged on the CMOS detector 4-1 after reflection through the plane transition mirror 3-1-4; the second waveband light is reflected to the convex diffraction grating 3-2-2 through the first concave spherical mirror 3-2-1 of the second spectrometer 3-2, then transmitted to the second concave spherical mirror 3-2-3 after fine beam splitting through the convex diffraction grating 3-2-2, further reflected to the plane transition mirror 3-2-4, and finally focused and imaged on the InGaAs detector 4-2 after reflection through the plane transition mirror 3-2-4; the third waveband light is reflected to the convex diffraction grating 3-3-2 through the first concave spherical mirror 3-3-1 of the third spectrometer 3-3, then transmitted to the second concave spherical mirror 3-3-3 after fine beam splitting through the convex diffraction grating 3-3-2, further reflected to plane transition mirror 3-3-4, and finally focused and imaged on the HgCdTe detector 4-3 after reflection through the plane transition mirror 3-3-4.

In the present invention, the positive first-order diffraction efficiency is always adopted for fine beam splitting through the convex diffraction grating 3-1-2 of the first spectrometer 3-1, the convex diffraction grating 3-2-2 of the second spectrometer 3-2, and the convex diffraction grating 3-3-2 of the third spectrometer 3-3.

In the present invention, the window of the CMOS detector 4-1 is coated with a layer of rear cut-off filter coating with a wavelength of $\lambda_2$, and the window of the InGaAs detector 4-2 is coated with a layer of front cut-off filter coating with a wavelength of $\lambda_3$; and the window of the HgCdTe detector 4-3 is coated with a layer of front cut-off filter coating with a wavelength of $\lambda_5$.

The present invention adopts the above technical solution, and has the following advantages.

First, the three-band spectrometer with the unique system and its optimized layout effectively eliminate the need of secondary spectra. The overlapping wavelength position of each band enables to realize the optimal matching between solar radiation energy and detective quantum efficiency (DQE), which avoids the problem of oversaturation of strong signals in a high-energy region of a solar reflection band caused by the high DQE, and also improves the signal intensity of low-energy regions at both ends of the solar reflection band, so that the optical flux of the system is uniformized in the solar reflection full-band range, and high quantum efficiency of the detector is achieved in the entire solar reflection full-band range, thus ensuring the optimal detection efficiency of the system.

Second, as the optical efficiency of this system has been optimized in the solar reflection full-band range, it is unnecessary to use substrate modified detectors to enhance quantum efficiency, thus fundamentally eliminating the existence of Etalon effect ripples in hyperspectral images, and achieving high-efficiency, high-precision detection at a high-spectral resolution in the solar reflection full-band range.

Third, regarding the system, the positive first-order diffraction efficiency of the convex grating is utilized for beam splitting, which makes the spectrometer more lightweight and miniature, and avoids the problem that effective energy is interfused after grating beam splitting of other ineffective energy (stray light) generated from grating beam splitting, greatly improving the purity of spectral detection of the target.

Fourth, the integrated trisection field-of-view separator of the system divides an imaging light path into three bands for input and output, and a slit dustproof protection sheet coated with a layer of front cut-off filter coating and a layer of rear cut-off filter coating is arranged in each field-of-view assembly, which prevents the slit target components from dust pollution, and matches with the cut-off filter coating arranged on the detector, so that spectral aliasing of invalid bands is eliminated, the spectral purity of each channel is ensured, the signal-to-noise ratio of the spectral channel is improved, and the optical efficiency of the detection system is optimized.

Fifth, the system of high-efficiency, high-precision detection at a high-spectral resolution developed according to the method of the present invention greatly reduces the complexity and difficulty of development of assembly parts under the premise of ensuring optimal detection performance.

BRIEF DESCRIPTION OF THE DRAWINGS

FIG. 1 is a schematic diagram of a spectrum curve of an aliasing effect of a 0.4 μm-0.5 μm second-order diffraction spectrum at the position of a 0.8 μm-1.0 μm first-order diffraction spectrum in the visible and near-infrared spectrometer in the prior art.

FIG. 2 is a schematic diagram of an aliasing effect of a 1.0 μm-1.25 μm second-order diffraction spectrum at the position of a 2.0 μm-2.5 μm first-order diffraction spectrum in a short-wave spectrometer in the prior art.

FIG. 3 is a schematic diagram of variation in quantum conversion efficiency of a CCD detector with wavelength change in the prior art.

FIG. 4 is a schematic diagram of detection performance of two-waveband light in a wavelength range of 0.4 μm-2.5 μm in the prior art.

FIGS. 5A and 5B show the impact of the Etalon effect introduced to enhance the quantum efficiency by using a two-end substrate-modified detector in the prior art on the response curve, where FIG. 5A shows the impact on the radiation response curve; and FIG. 5B shows the impact on the spectral response curve.

FIG. 8A is a schematic diagram of the spectrometer with a negative first-order grating diffraction ray; and FIG. 8B shows the impact on the negative first-order grating diffraction of the spectrometer by stray light of other orders.

FIG. 9A shows the curve of diffraction efficiency of grating of various-orders of grating diffraction (negative first-order, negative second-order, negative third-order, and zero-order); and FIG. 9B shows the curve of diffraction efficiency of grating of various-orders of grating diffraction (negative fourth-order, positive first-order, positive second-order, positive third-order, and positive fourth-order).

FIG. 10A is a schematic diagram of the spectrometer with a positive first-order grating diffraction ray; and FIG. 10B shows the impact on the positive first-order grating diffraction of the spectrometer by stray light of other orders.

FIG. 11A shows the curve of diffraction efficiency of grating of various-orders of grating diffraction (positive first-order, positive second-order, positive third-order, and zero-order); and FIG. 11B shows the curve of diffraction efficiency of grating of various-orders of grating diffraction (positive fourth-order, negative first-order, negative second-order, negative third-order, and negative fourth-order).

DETAILED DESCRIPTION OF THE INVENTION AND EMBODIMENTS

To illustrate and further elucidate the present invention, a specific embodiment of the present invention is further described in detail. Many specific details are set forth in the following description to facilitate full understanding of the present invention. However, the present disclosure may be implemented in many other modes different from those described herein. Therefore, the present invention is not limited by the specific embodiments disclosed below.

Figure 6:
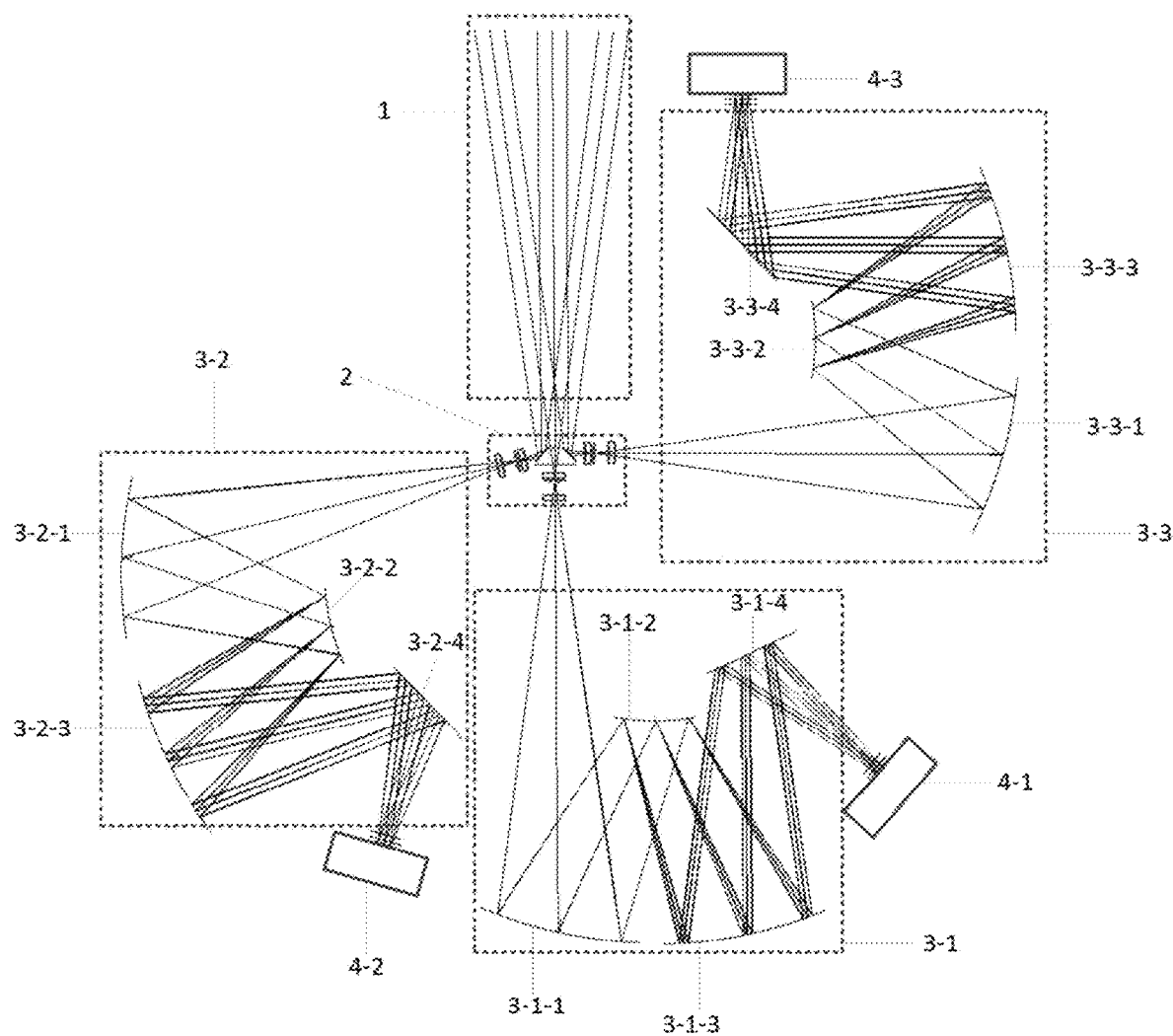
FIG. 6 is a schematic diagram of the structure of a solar reflection full-band hyperspectral imaging detection system of the present invention.
Figure 7:
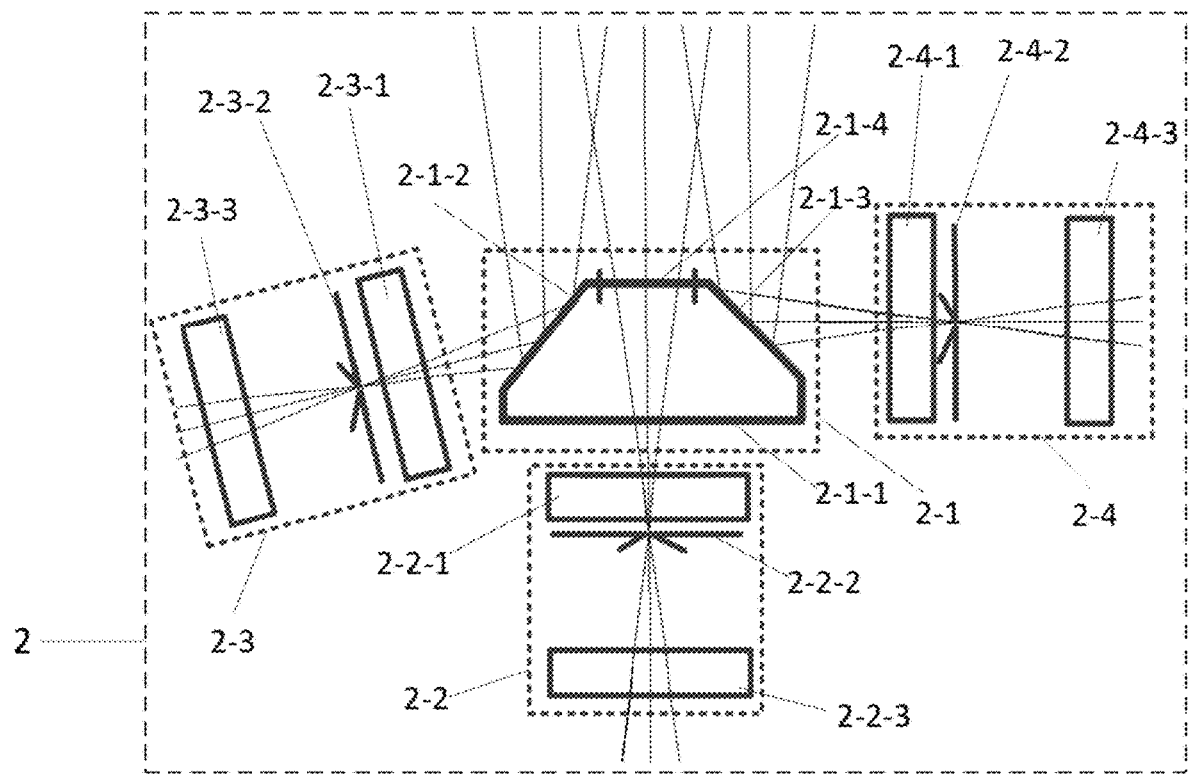
FIG. 7 is a schematic diagram of the structure of a field-of-view separation assembly of the solar reflection full-band hyperspectral imaging detection system of the present invention.
Figure 8A:
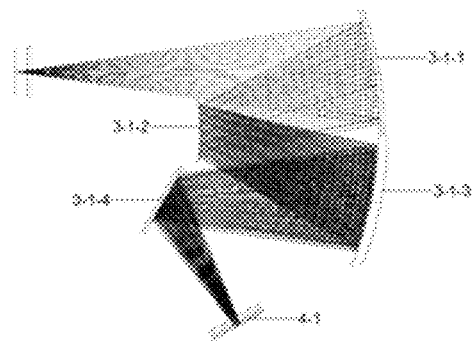
FIGS. 8A and 8B are schematic diagrams of a light path affected by other orders of diffracted stray light when a negative first order is selected as an effective grating diffraction order of a spectrometer in a specific embodiment, where
Figure 8B:
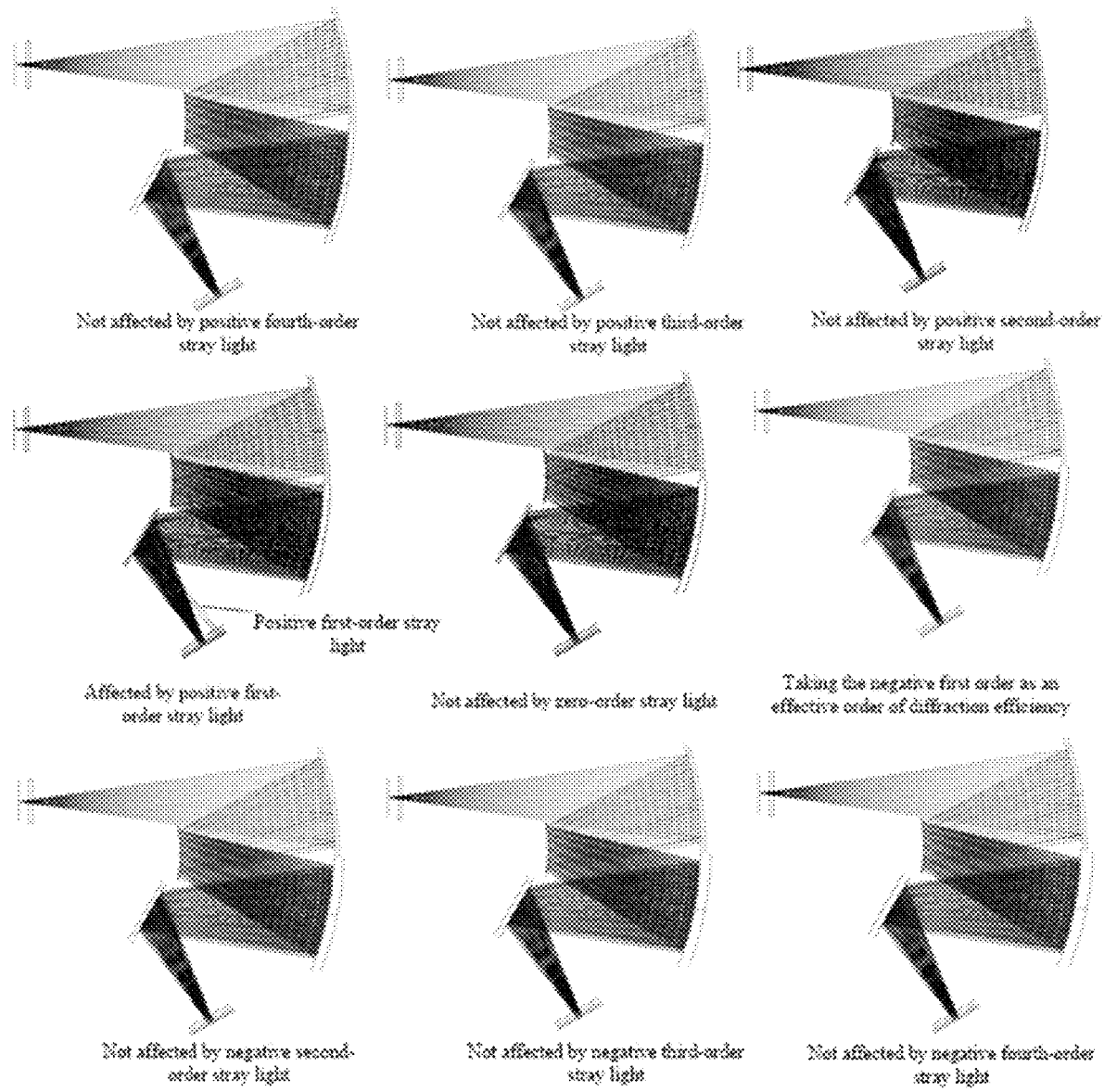
Figure 9A:
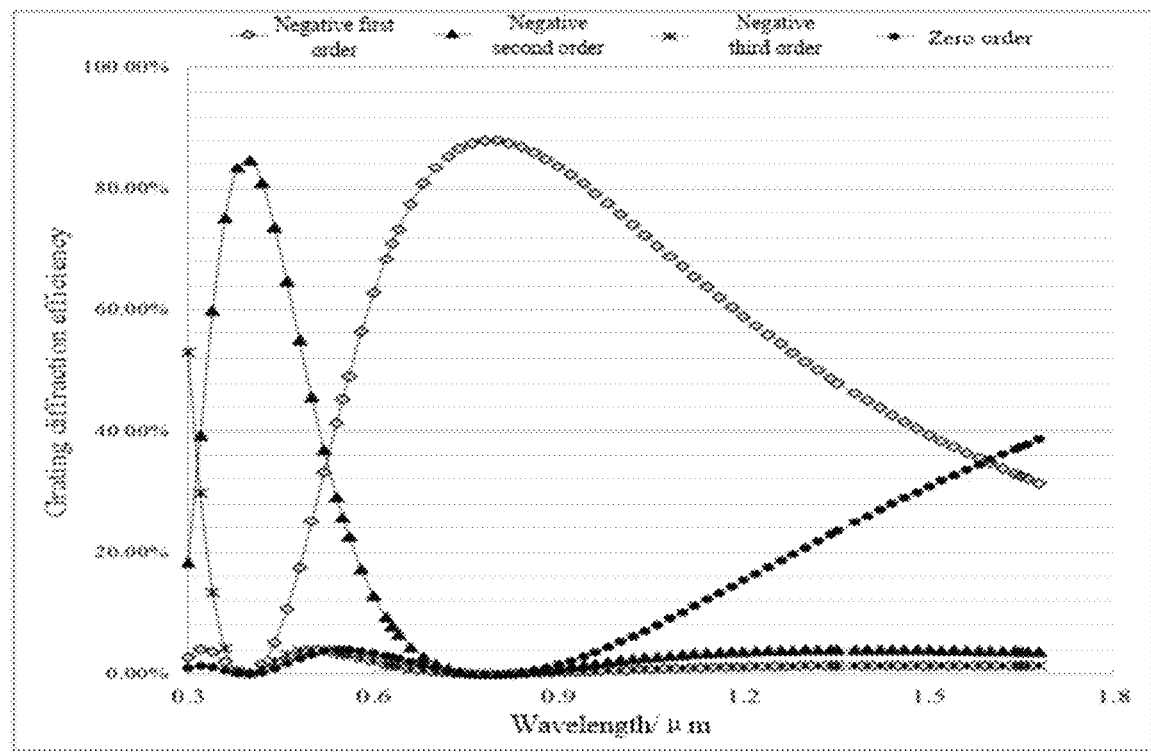
FIGS. 9A and 9B are schematic diagrams of the curve of an energy efficiency ratio of each-order of grating diffraction in case of the negative first-order effective grating diffraction of a spectrometer in a specific embodiment; where
Figure 9B:
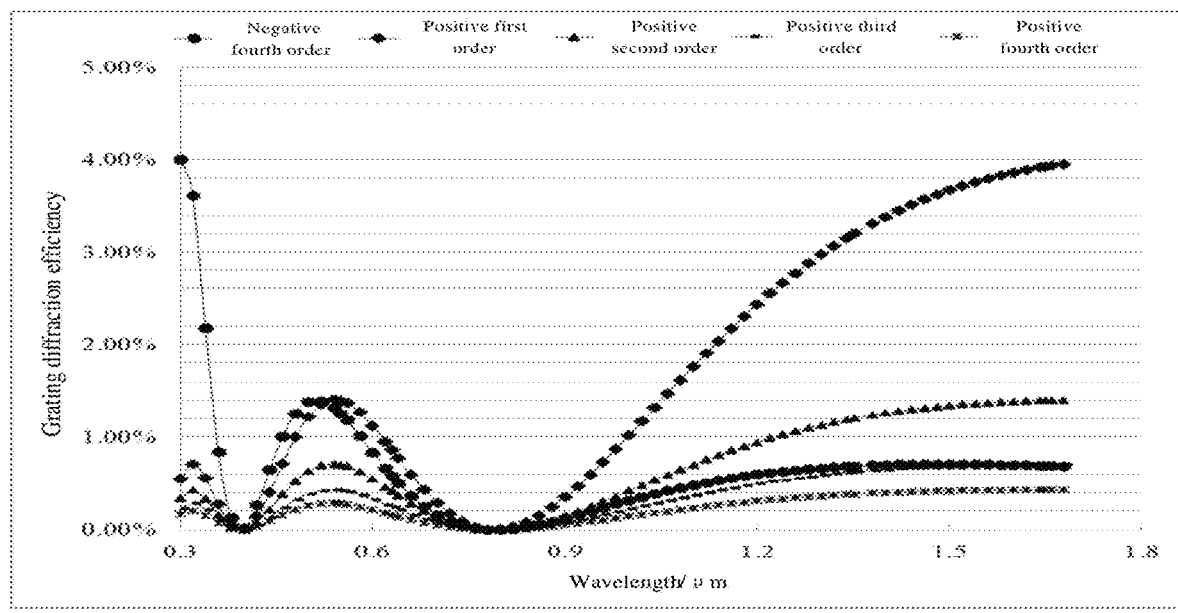
Figure 10A:
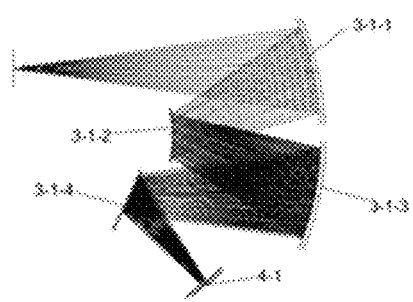
FIGS. 10A and 10B are schematic diagrams of a light path affected by other orders of diffracted stray light when a positive first-order is taken as an effective grating diffraction order of a spectrometer in a specific embodiment, where
Figure 10B:
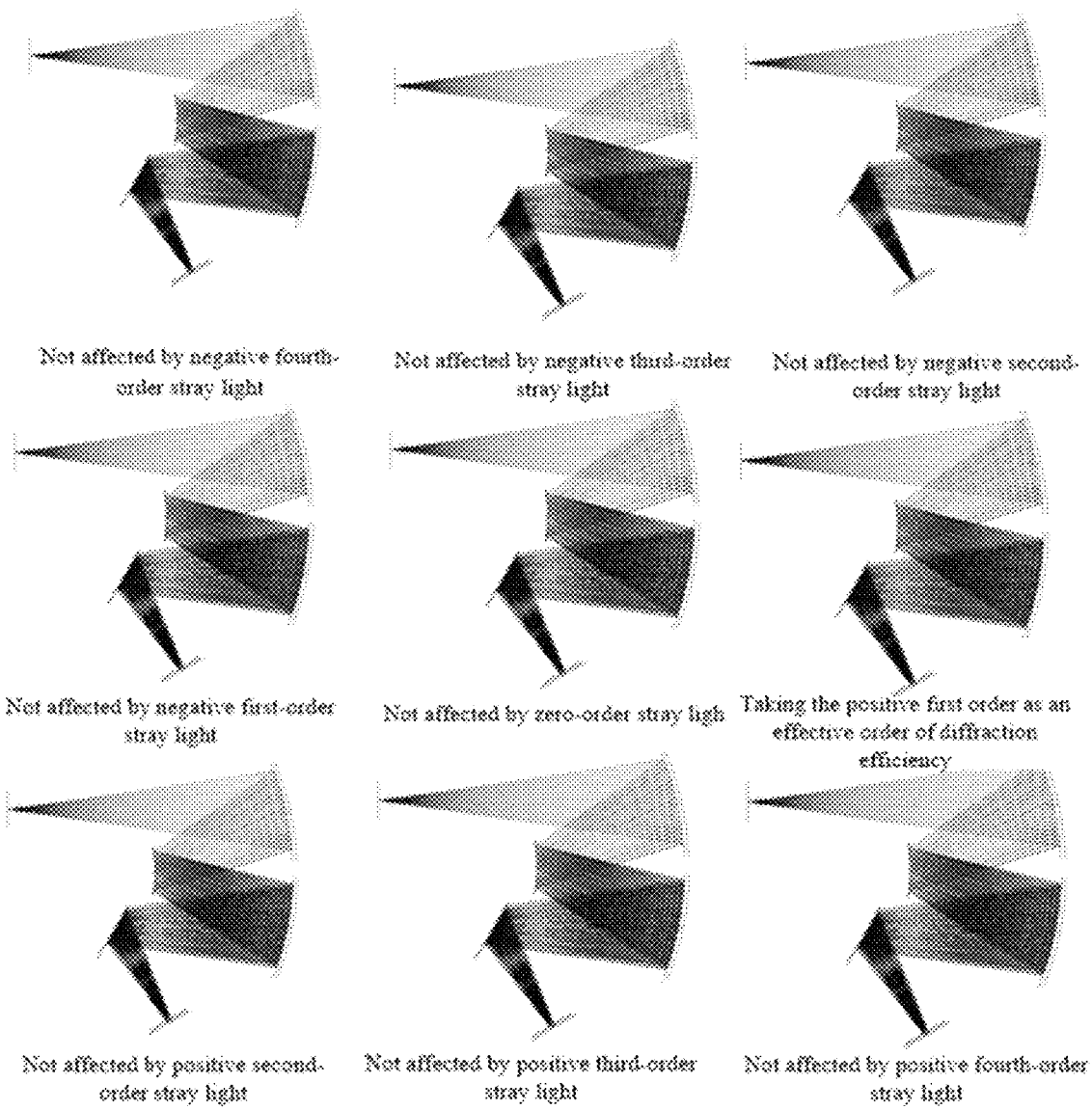
Figure 11A:
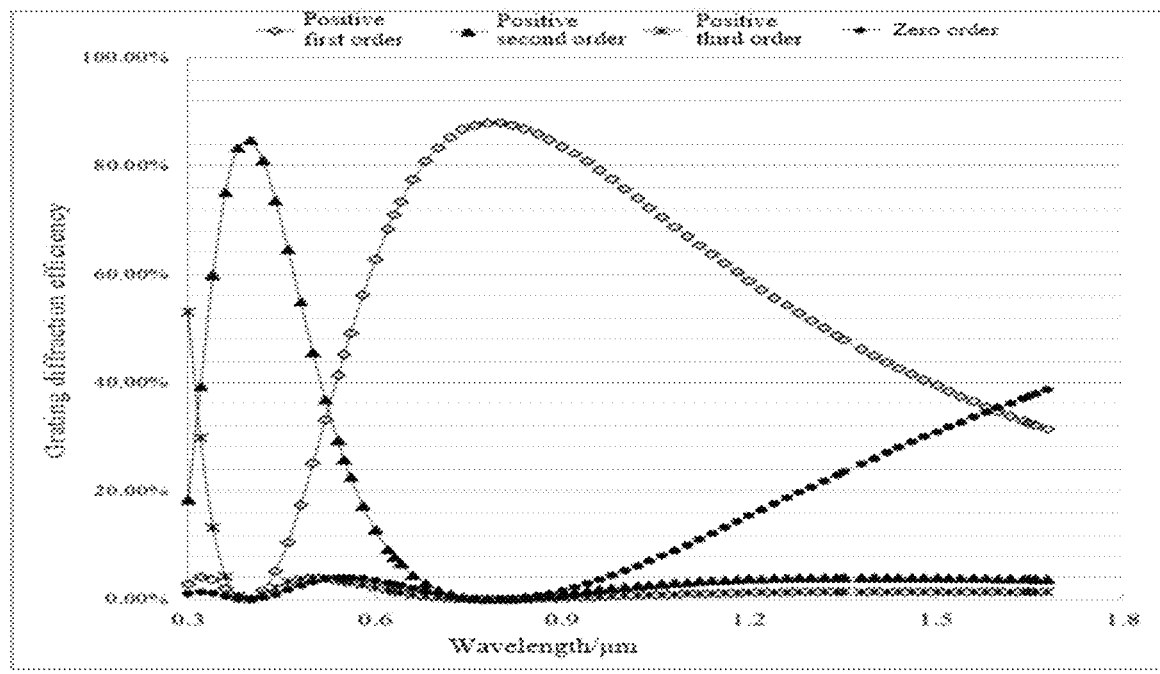
FIGS. 11A and 11B are schematic diagrams of the curve of an energy efficiency ratio of each-order of grating diffraction in case of the positive first-order effective grating diffraction of a spectrometer in a specific embodiment; where
Figure 11B:
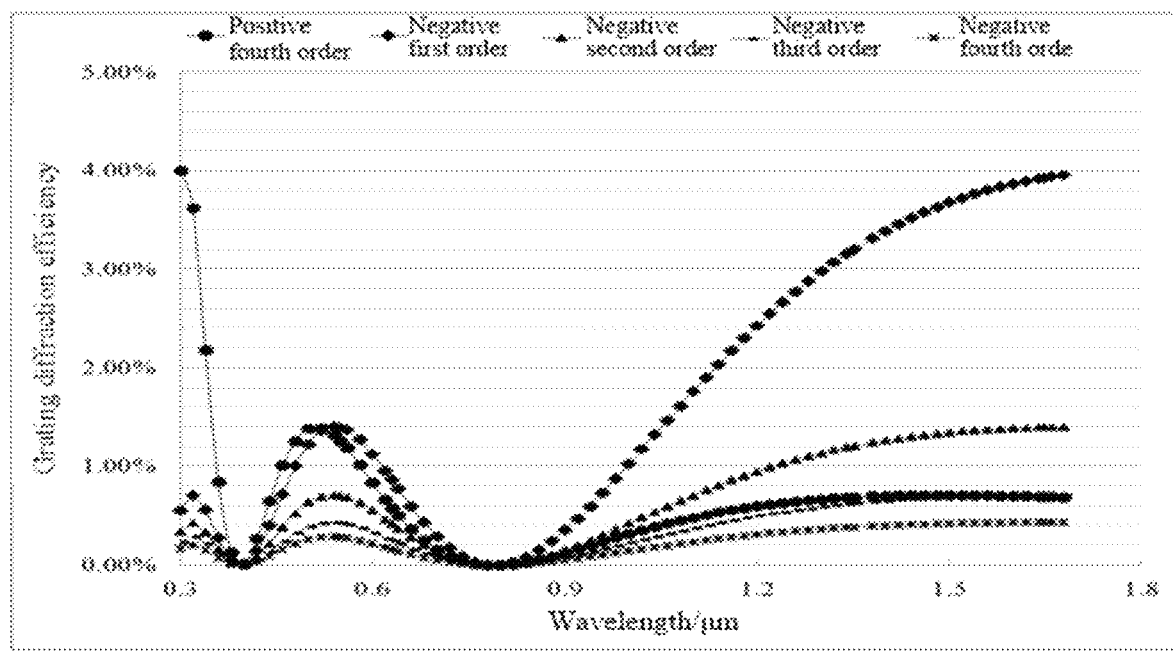
Figure 12:
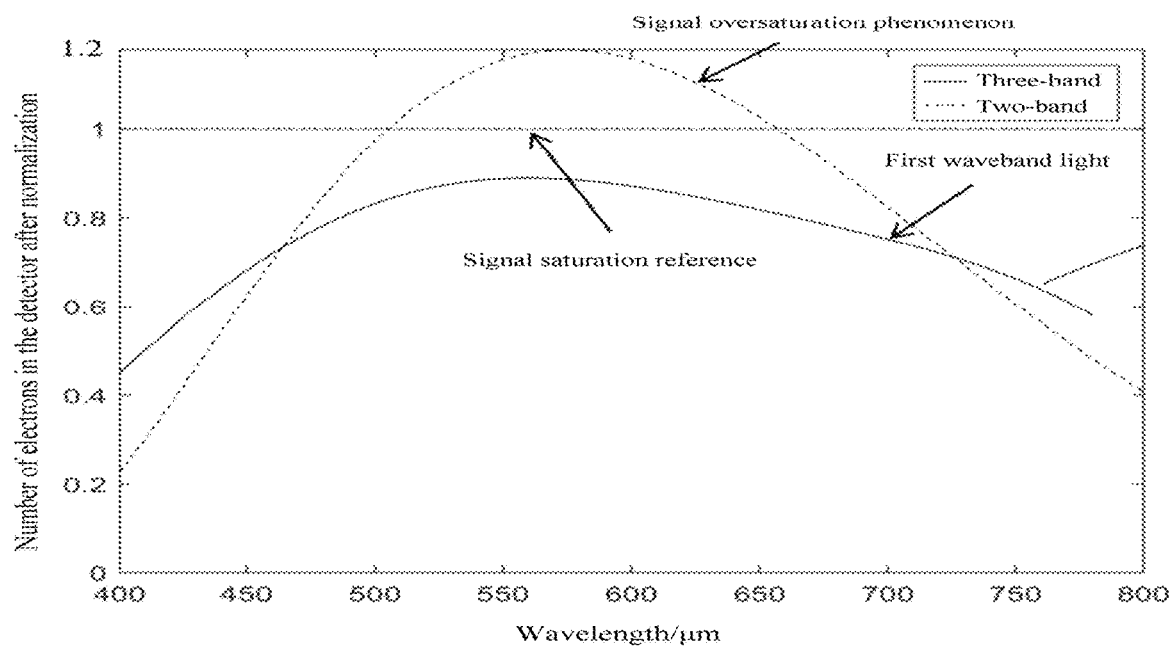
FIG. 12 is a schematic diagram of comparing the detection performance of the detection system of the present invention and the detection system of a conventional two-band spectrometer in the first waveband light range (0.4 μm-0.76 μm) in a specific embodiment.
Figure 13:
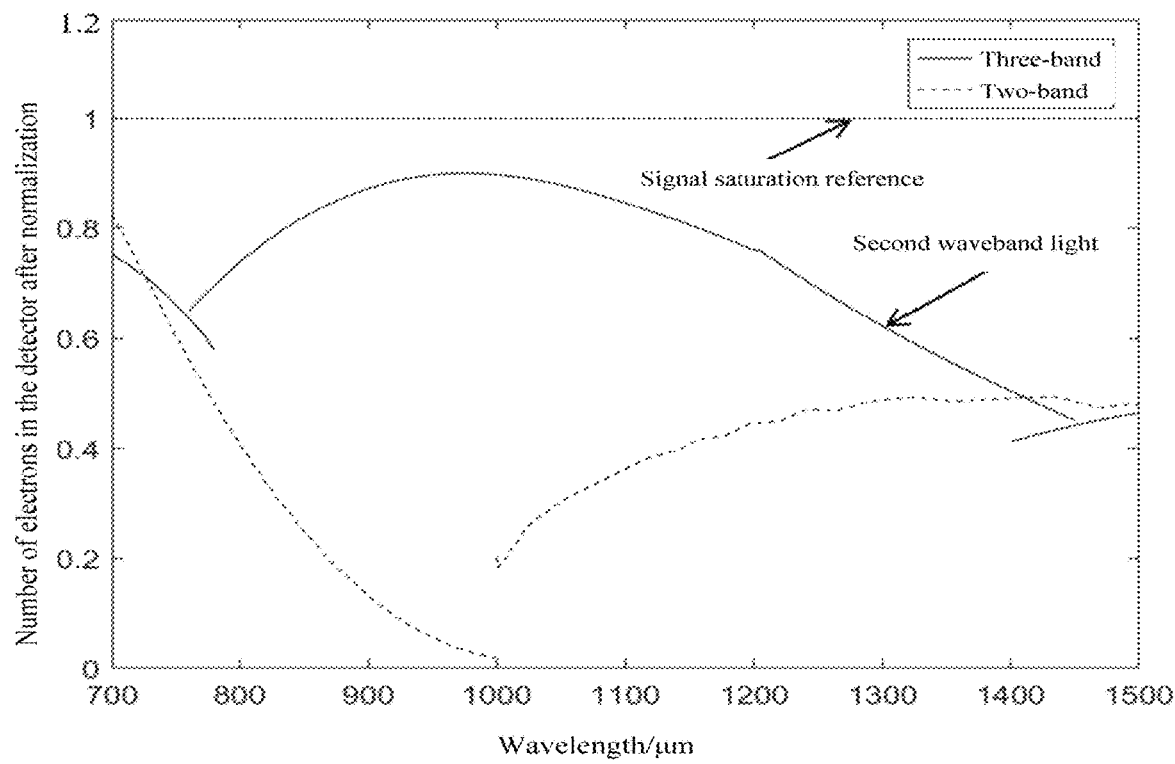
FIG. 13 is a schematic diagram of comparing the detection performance of the detection system of the present invention and the detection system of a conventional two-band spectrometer in the second waveband light range (0.74 μm-1.434 μm) in a specific embodiment.
Figure 14:
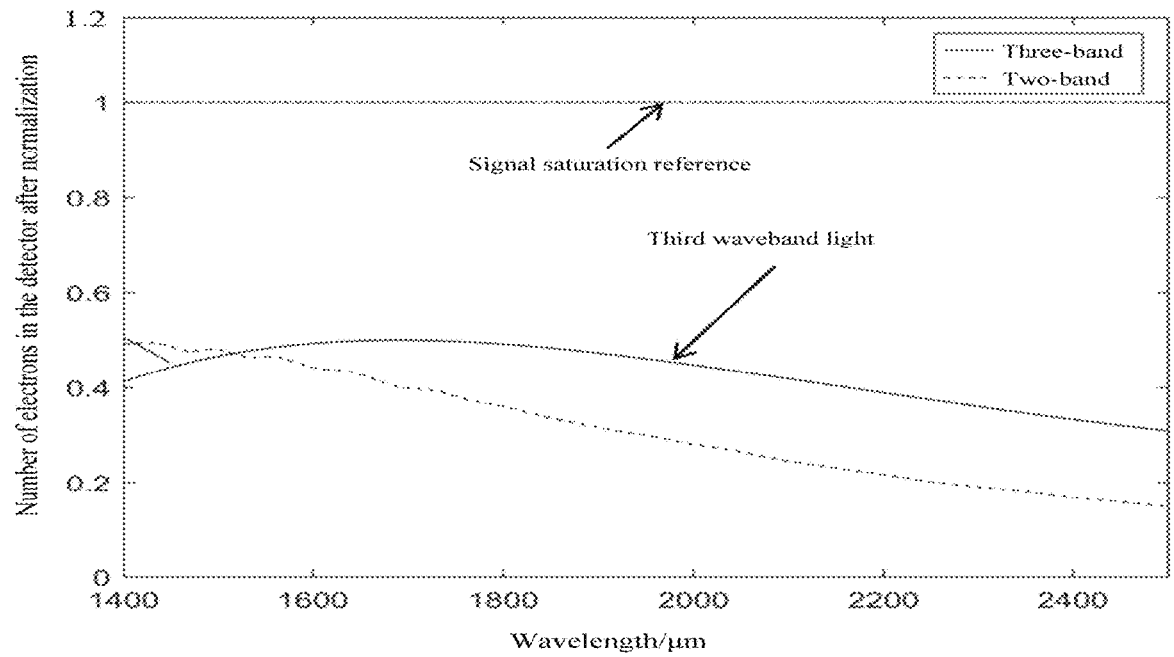
FIG. 14 is a schematic diagram of comparing the detection performance of the detection system of the present invention and the detection system of a conventional two-band spectrometer in the third waveband light range (1.416 μm-2.5 μm) in a specific embodiment.
Figure 15:
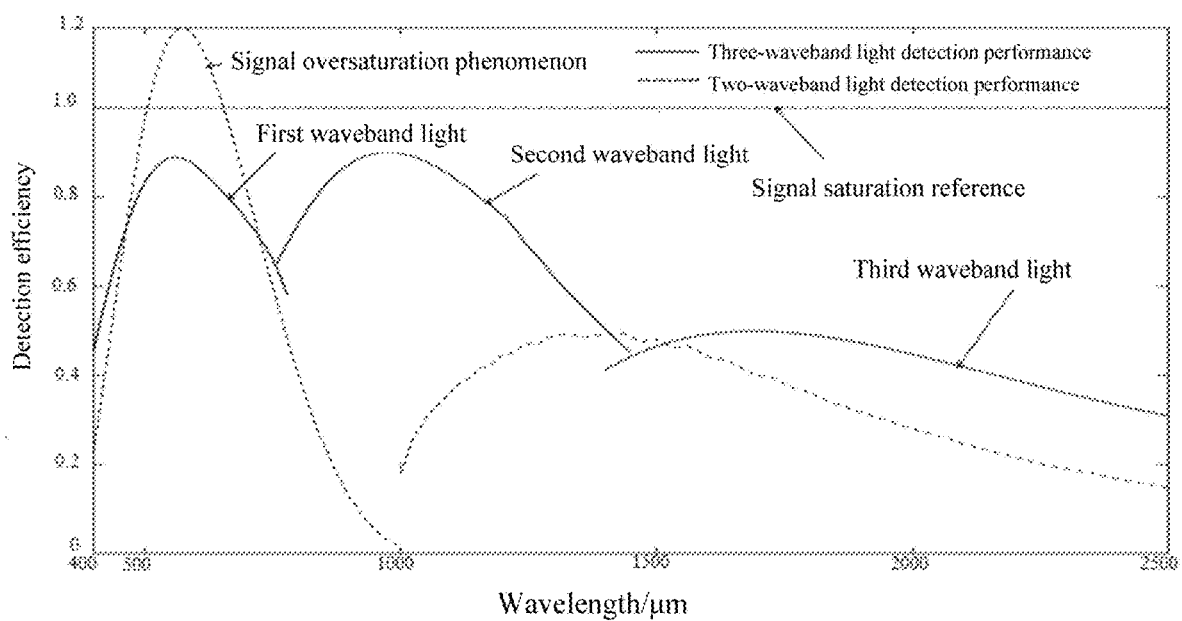
FIG. 15 is a schematic diagram of comparing the detection performance of the detection system of the present invention and the detection system of a conventional two-band spectrometer in the solar reflection full-band range (0.4 μm-2.5 μm) in a specific embodiment.

According to the system of high-efficiency, high-precision detection at a high-spectral resolution in the solar reflection full-band range of the present invention, a visible-near-infrared-short-wave (0.4 μm-2.5 μm) hyperspectral detection system is designed, which, as shown in FIGS. 6 and 7, comprises a telescope light collection system 1, a field-of-view separation assembly 2, a spectrometer assembly 3, and a detector assembly 4, where the field-of-view separation assembly 2 comprises an integrated trisection field-of-view separator 2-1, a first field-of-view assembly 2-2, a second field-of-view assembly 2-3 and a third field-of-view assembly 2-4; the spectrometer assembly 3 comprises a first spectrometer 3-1, a second spectrometer 3-2 and a third spectrometer 3-3; and the detector assembly 4 comprises a CMOS (Complementary Metal Oxide Semiconductor) detector 4-1, an InGaAs detector 4-2, and an HgCdTe detector 4-3;

the integrated trisection field-of-view separator 2-1 comprises a trapezoid-like primary prism 2-1-1, and a first reflecting mirror 2-1-2 and a second reflecting mirror 2-1-3 located on both sides of the primary prism 2-1-1, where a light path 2-1-4 is arranged at the center of the primary prism;

the first field-of-view assembly 2-2 comprises a slit dustproof protection sheet 2-2-1 coated with a layer of front cut-off filter coating with a wavelength of 0.4 μm, a long slit target 2-2-2 with a wedge angle, and a slit dustproof protection sheet 2-2-3 coated with a layer of rear cut-off filter coating with a wavelength of 0.76 μm;

the second field-of-view assembly 2-3 comprises a slit dustproof protection sheet 2-3-1 coated with a layer of front cut-off filter coating with a wavelength of 0.74 μm, a long slit target 2-3-2 with a wedge angle, and a slit dustproof protection sheet 2-3-3 coated with a layer of rear cut-off filter coating with a wavelength of 1.434 μm;

the third field-of-view assembly 2-4 comprises a slit dustproof protection sheet 2-4-1 coated with a layer of front cut-off filter coating with a wavelength of 1.416 μm, a long slit target 2-4-2 with a wedge angle, and a slit dustproof protection sheet 2-4-3 coated with a layer of rear cut-off filter coating with a wavelength of 2.5 μm;

after the light of the target is collected through the telescope light collection system 1, a ray of light is formed through the light path 2-1-4 of the primary prism 2-1-1 of the integrated trisection field-of-view separator 2-1, a ray of light is formed after reflection through the first reflecting mirror 2-1-2, and another ray of light is formed after reflection through the second reflecting mirror 2-1-3; the ray of light formed through the light path 2-1-4 of the primary prism 2-1-1 sequentially passes through the slit dustproof protection sheet 2-2-1 coated with a layer of front cut-off filter coating with a wavelength of 0.4 μm, the long slit target 2-2-2 with a wedge angle, and the slit dustproof protection sheet 2-2-3 coated with a layer of rear cut-off filter coating with a wavelength of 0.76 μm to obtain the first waveband light with a wavelength range of 0.4 μm-0.76 μm; the ray of light formed after reflection through the first reflecting mirror 2-1-2 sequentially passes through the slit dustproof protection sheet 2-3-1 coated with a layer of front cut-off filter coating with a wavelength of 0.74 μm, the long slit target 2-3-2 with a wedge angle, and the slit dustproof protection sheet 2-3-3 coated with a layer of rear cut-off filter coating with a wavelength of 1.434 μm to obtain the second waveband light with a wavelength range of 0.74 μm-1.434 μm; and the ray of light formed after reflection through the second reflecting mirror 2-1-3 sequentially passes through the slit dustproof protection sheet 2-4-1 coated with a layer of front cut-off filter coating with a wavelength of 1.416 μm, the long slit target 2-4-2 with a wedge angle, and the slit dustproof protection sheet 2-4-3 coated with a layer of rear cut-off filter coating with a wavelength of 2.5 μm to obtain the second waveband light with a wavelength range of 1.416 μm-2.5 μm.

In the present invention, the first spectrometer 3-1, the second spectrometer 3-2, and the third spectrometer 3-3 are all grating-based spectrometers, and the grating-based spectrometer structure comprises a first concave spherical mirror, a convex diffraction grating, a second concave spherical mirror, and a plane transition mirror; the first waveband light is reflected to the convex diffraction grating 3-1-2 through the first concave spherical mirror 3-1-1 of the first spectrometer 3-1, then transmitted to the second concave spherical mirror 3-1-3 after fine beam splitting through the convex diffraction grating 3-1-2, further reflected to the plane transition mirror 3-1-4, and finally focused and imaged on the CMOS detector 4-1 after reflection through the plane transition mirror 3-1-4; the second waveband light is reflected to the convex diffraction grating 3-2-2 through the first concave spherical mirror 3-2-1 of the second spectrometer 3-2, then transmitted to the second concave spherical mirror 3-2-3 after fine beam splitting through the convex diffraction grating 3-2-2, further reflected to the plane transition mirror 3-2-4, and finally focused and imaged on the InGaAs detector 4-2 after reflection through the plane transition mirror 3-2-4; the third waveband light is reflected to the convex diffraction grating 3-3-2 through the first concave spherical mirror 3-3-1 of the third spectrometer 3-3, then transmitted to the second concave spherical mirror 3-3-3 after fine beam splitting through the convex diffraction grating 3-3-2, further reflected to plane transition mirror 3-3-4, and finally focused and imaged on the HgCdTe detector 4-3 after reflection through the plane transition mirror 3-3-4; and the positive first-order diffraction efficiency is always adopted for fine beam splitting through the convex diffraction grating 3-1-2 of the first spectrometer 3-1, the convex diffraction grating 3-2-2 of the second spectrometer 3-2, and the convex diffraction grating 3-3-2 of the third spectrometer 3-3. Taking the first spectrometer 3-1 as an example, the first waveband light is reflected to the convex diffraction grating 3-1-2 through the first concave spherical mirror 3-1-1 of the first spectrometer 3-1, then transmitted to the second concave spherical mirror 3-1-3 after fine beam splitting through the convex diffraction grating 3-1-2, further reflected to the plane transition mirror 3-1-4, and finally focused and imaged on the CMOS detector 4-1 after reflection through the plane transition mirror 3-1-4. If the negative first order is taken as an effective order of diffraction efficiency, as shown in FIGS. 8A to 9B, the diffracted light energy of the positive first order occupies a large proportion in the solar reflection full-band range, and stray light that affects system performance is generated after grating diffraction of the diffracted light again. If the positive first order is taken as an effective order of diffraction efficiency, as shown in FIGS. 10A to 11B, any other order of diffracted light no longer passes through the grating, so stray light that affects the spectrometer system is not generated. Therefore, the present invention adopts the positive first-order diffraction efficiency of convex grating for beam splitting, which ensures the minimum volume of the spectrometer, avoids the impact from negative second-order diffracted stray light in a light path with a relatively large energy ratio, ensures that an optimal grating diffraction efficiency is available to incident light of each band, narrows the spectral detection range, and ensures the detection at a high-spectral resolution through the system.

The overlapping wavelength of the second waveband light is located in a high quantum efficiency region of the CMOS detector 4-1, the overlapping wavelength of the third waveband light is located in a high quantum efficiency region of the InGaAs detector 4-2, and the continuous high quantum efficiency detection in a range of $\lambda_1$-$\lambda_6$ from the first waveband light to the third waveband light is realized. As shown in FIG. 4, the two-band division method for the traditional solar reflection full-band infrared hyperspectral imaging system (0.4 µm-1.0 µm) (1.0 µm-2.5 µm) has the deficiency that spectral channel signal oversaturation may easily occur in a high-energy region of a solar reflection band (0.50 µm-0.65 µm), and the target energy received in a low-energy region at both ends of the solar reflection band (0.40 µm-0.50 µm) and (0.75 µm-1.0 µm) is significantly lower than that in the middle thereof, resulting in that the detection signal-to-noise ratio at both ends of the band is too low, the optical flux of the system is unbalanced, and the detection efficiency is low. Different from the traditional two-band division method, the three-band spectrometer is adopted in the present invention. As shown in FIGS. 12, 13, 14, and 15, the first waveband light (0.4 µm-0.76 µm), the second waveband light (0.74 µm-1.4346 µm), and the third waveband light (1.416 µm-2.5 µm) are generated, which can effectively reduce the optical flux in the high-energy region of the solar reflection band (0.50 µm-0.65 µm), increase the optical flux in the low-energy region of the solar reflection band (0.40 µm-0.50 µm) (0.75 µm-2.5 µm), avoids the problem of oversaturation of strong signals in a high-energy region of a solar reflection band caused by the high DQE, and also improves the deficiency signal intensity of low-energy regions at both ends of the solar reflection band, so that the optical flux of the system is uniformized in the solar reflection full-band range, and high quantum efficiency of the detector is achieved in the entire solar reflection full-band range, thus ensuring the optimal detection efficiency of the system.

In the present invention, the window of the CMOS detector 4-1 is coated with a layer of rear cut-off filter coating with a wavelength of 0.76 µm, and the window of the InGaAs detector 4-2 is coated with a layer of front cut-off filter coating with a wavelength of 0.74 µm; and the window of the HgCdTe detector 4-3 is coated with a layer of front cut-off filter coating with a wavelength of 1.416 µm.

The solar reflection full-band hyperspectral imaging detection system of the present invention comprises a telescope light collection system, a field-of-view separation assembly, a spectrometer assembly, and a detector assembly, where the field-of-view separation assembly comprises an integrated trisection field-of-view separator, a first field-of-view assembly, a second field-of-view assembly, and a third field-of-view assembly; the spectrometer assembly comprises a first spectrometer, a second spectrometer and a third spectrometer; and the detector assembly comprises a CMOS (Complementary Metal Oxide Semiconductor) detector, an InGaAs detector, and an HgCdTe detector. According to the present invention, the three-band spectrometer is adopted, and the long-standing problems of spectrum aliasing, high photoelectric efficiency in the middle and low photoelectric efficiency at two ends, limited detection dynamic range, severe Etalon interference effect and the like of a two-band spectrometer with a traditional solar reflection full-band hyperspectral detection system are solved, so that the range, efficiency and precision of the hyperspectral detection system are optimized, the problems are fundamentally solved, and the complexity and difficulty of photoelectric assembly parts are systematically simplified while the overall detection efficiency is improved.

The above are merely preferred embodiments of the present invention, and are not intended to limit the present invention. Any modifications, equivalent replacements and improvements made within the spirit and principle of the present invention should fall within the protection scope of the present invention.

We claim:

1. A solar reflection full-band hyperspectral imaging detection system, comprising
a telescope light collection system (1),
a field-of-view separation assembly (2), wherein the field-of-view separation assembly (2) further comprises
an integrated trisection field-of-view separator (2-1),
a first field-of-view assembly (2-2),
a second field-of-view assembly (2-3), and
a third field-of-view assembly (2-4);
a spectrometer assembly (3), wherein the spectrometer assembly (3) further comprises
a first spectrometer (3-1),
a second spectrometer (3-2), and
a third spectrometer (3-3); and
a detector assembly (4), wherein the detector assembly (4) further comprises a CMOS (Complementary Metal Oxide Semiconductor) detector (4-1),
an InGaAs detector (4-2), and
an HgCdTe detector (4-3),
wherein after a light from a target is collected by the telescope light collection system (1), three rays of the light are formed through the integrated trisection field-of-view separator (2-1),
a first waveband light with a wavelength range of $\lambda_1$-$\lambda_2$ is formed after a first ray of light passes through the first field-of-view assembly (2-2),
a second waveband light with a wavelength range of $\lambda_3$-$\lambda_4$ is formed after a second ray of light passes through the second field-of-view assembly (2-3), and
a third waveband light with a wavelength range of $\lambda 5$-$\lambda 6$ is formed after a third ray of light passes through the third field-of-view assembly (2-4);
the first waveband light is focused and imaged on the CMOS detector (4-1) after beam splitting through the first spectrometer (3-1),
the second-waveband light is focused and imaged on the InGaAs detector (4-2) after beam splitting through the second spectrometer (3-2), and
the third spectrometer (3-3) is focused and imaged on the HgCdTe detector (4-3) after beam splitting through the third spectrometer (3-3),
wherein $\lambda_1 < \lambda_3 \leq \lambda_2 <_5 \leq \lambda_4 < \lambda_6$, and a minimum wavelength in each wavelength range is not less than half of the maximum wavelength as $\lambda_2 < 2\lambda_1$, $\lambda_4 < 2\lambda_3$, $\lambda_6 < 2\lambda_5$;
an overlapping wavelength of the second waveband light is located in a high quantum efficiency region of the CMOS detector (4-1),
an overlapping wavelength of the third waveband light is located in a high quantum efficiency region of the InGaAs detector (4-2), and
a continuous high quantum efficiency detection in a range of $\lambda_1$-$\lambda_6$ from the first waveband light to the third waveband light is realized.

2. The solar reflection full-band hyperspectral imaging detection system according to claim 1, wherein the integrated trisection field-of-view separator (2-1) comprises
a trapezoid-like primary prism (2-1-1), and
a first reflecting mirror (2-1-2) and a second reflecting mirror (2-1-3) respectively located on both sides of the primary prism (2-1-1),
wherein a light path (2-1-4) is arranged at a center of the primary prism (2-1-1),
after the light of the target is collected through the telescope light collection system (1), the first ray of light is formed through the light path (2-1-4) of the primary prism (2-1-1), the second ray of light is formed after reflection through the first reflecting mirror (2-1-2), and the third ray of light is formed after reflection through the second reflecting mirror (2-1-3).

3. The solar reflection full-band hyperspectral imaging detection system according to claim 2, wherein the first field-of-view assembly (2-2) comprises
a slit dustproof protection sheet (2-2-1) coated with a layer of front cut-off filter coating with a wavelength of $\lambda_1$,
a long slit target (2-2-2) with a wedge angle, and
a slit dustproof protection sheet (2-2-3) coated with a layer of rear cut-off filter coating with a wavelength of $\lambda_2$;
wherein the ray of light formed through the light path (2-1-4) of the primary prism (2-1-1) sequentially passes through the slit dustproof protection sheet (2-2-1) coated with a layer of front cut-off filter coating with a wavelength of $\lambda_1$, the long slit target (2-2-2) with a wedge angle, and the slit dustproof protection sheet (2-2-3) coated with a layer of rear cut-off filter coating with a wavelength of $\lambda_2$ to obtain the first waveband light with a wavelength range of $\lambda_1$-$\lambda_2$.

4. The solar reflection full-band hyperspectral imaging detection system according to claim 2, wherein the second field-of-view assembly (2-3) comprises
a slit dustproof protection sheet (2-3-1) coated with a layer of front cut-off filter coating with a wavelength of $\lambda_3$,
a long slit target (2-3-2) with a wedge angle, and
a slit dustproof protection sheet (2-3-3) coated with a layer of rear cut-off filter coating with a wavelength of $\lambda_4$;
wherein the ray of light formed after reflection through the first reflecting mirror (2-1-2) sequentially passes through the slit dustproof protection sheet (2-3-1) coated with a layer of front cut-off filter coating with a wavelength of $\lambda_3$, the long slit target (2-3-2) with a wedge angle, and the slit dustproof protection sheet (2-3-3) coated with a layer of rear cut-off filter coating with a wavelength of $\lambda_4$ to obtain the second waveband light with a wavelength range of $\lambda_3$-$\lambda_4$.

5. The solar reflection full-band hyperspectral imaging detection system according to claim 2, wherein the third field-of-view assembly (2-4) comprises
a slit dustproof protection sheet (2-4-1) coated with a layer of front cut-off filter coating with a wavelength of $\lambda_5$,
a long slit target (2-4-2) with a wedge angle, and
a slit dustproof protection sheet (2-4-3) coated with a layer of rear cut-off filter coating with a wavelength of $\lambda_6$,
wherein the ray of light formed after reflection through the second reflecting mirror sequentially passes through the slit dustproof protection sheet (2-4-1) coated with a layer of front cut-off filter coating with a wavelength of $\lambda_5$, the long slit target (2-4-2) with a wedge angle, and the slit dustproof protection sheet (2-4-3) coated with a layer of rear cut-off filter coating with a wavelength of $\lambda_6$ to obtain the second waveband light with a wavelength range of $\lambda_5$-$\lambda_6$.

6. The solar reflection full-band hyperspectral imaging detection system according to claim 1, wherein the first field-of-view assembly (2-2) comprises
a slit dustproof protection sheet (2-2-1) coated with a layer of front cut-off filter coating with a wavelength of $\lambda_1$,
a long slit target (2-2-2) with a wedge angle, and
a slit dustproof protection sheet (2-2-3) coated with a layer of rear cut-off filter coating with a wavelength of $\lambda_2$;
wherein the ray of light formed through the light path (2-1-4) of the primary prism (2-1-1) sequentially passes through the slit dustproof protection sheet (2-2-1) coated with a layer of front cut-off filter coating with a wavelength of $\lambda_1$, the long slit target (2-2-2) with a wedge angle, and the slit dustproof protection sheet (2-2-3) coated with a layer of rear cut-off filter coating with a wavelength of $\lambda_2$ to obtain the first waveband light with a wavelength range of $\lambda_1$-$\lambda_2$.

7. The solar reflection full-band hyperspectral imaging detection system according to claim 1, wherein the second field-of-view assembly (2-3) comprises a slit dustproof protection sheet (2-3-1) coated with a layer of front cut-off filter coating with a wavelength of $\lambda_3$, a long slit target (2-3-2) with a wedge angle, and a slit dustproof protection sheet (2-3-3) coated with a layer of rear cut-off filter coating with a wavelength of $\lambda_4$;

wherein the ray of light formed after reflection through the first reflecting mirror (2-1-2) sequentially passes through the slit dustproof protection sheet (2-3-1) coated with a layer of front cut-off filter coating with a wavelength of $\lambda_3$, the long slit target (2-3-2) with a wedge angle, and the slit dustproof protection sheet (2-3-3) coated with a layer of rear cut-off filter coating with a wavelength of $\lambda_4$ to obtain the second waveband light with a wavelength range of $\lambda_3$-$\lambda_4$.

8. The solar reflection full-band hyperspectral imaging detection system according to claim 1, wherein the third field-of-view assembly (2-4) comprises a slit dustproof protection sheet (2-4-1) coated with a layer of front cut-off filter coating with a wavelength of $\lambda_5$, a long slit target (2-4-2) with a wedge angle, and a slit dustproof protection sheet (2-4-3) coated with a layer of rear cut-off filter coating with a wavelength of $\lambda_6$, wherein the ray of light formed after reflection through the second reflecting mirror sequentially passes through the slit dustproof protection sheet (2-4-1) coated with a layer of front cut-off filter coating with a wavelength of as, the long slit target (2-4-2) with a wedge angle, and the slit dustproof protection sheet (2-4-3) coated with a layer of rear cut-off filter coating with a wavelength of $\lambda_6$ to obtain the second waveband light with a wavelength range of $\lambda_5$-$\lambda_6$.

9. The solar reflection full-band hyperspectral imaging detection system according to claim 1, wherein the first spectrometer (3-1), the second spectrometer (3-2), and the third spectrometer (3-3) are all grating-based spectrometers, and the grating-based spectrometer structure comprises
a first concave spherical mirror,
a convex diffraction grating,
a second concave spherical mirror, and
a plane transition mirror;
wherein the first waveband light, the second waveband light, or the third waveband light is reflected to the convex diffraction grating through the first concave spherical mirror of the first spectrometer (3-1), the second spectrometer (3-2) or the third spectrometer (3-3), then transmitted to the second concave spherical mirror after fine beam splitting through the convex diffraction grating, further reflected to the plane transition mirror, and finally focused and imaged on the CMOS detector (4-1), the InGaAs detector (4-2) or the HgCdTe detector (4-3) respectively after reflection through the plane transition mirror.

10. The solar reflection full-band hyperspectral imaging detection system according to claim 9, wherein a positive first-order diffraction efficiency is adopted for fine beam splitting through the convex diffraction grating of the first spectrometer (3-1), the second spectrometer (3-2), and the third spectrometer (3-3).

11. The solar reflection full-band hyperspectral imaging detection system according to claim 9, wherein a window of the CMOS detector (4-1) is coated with a layer of rear cut-off filter coating with a wavelength of $\lambda_2$.

12. The solar reflection full-band hyperspectral imaging detection system according to claim 9, wherein a window of the InGaAs detector (4-2) is coated with a layer of front cut-off filter coating with a wavelength of $\lambda_3$.

13. The solar reflection full-band hyperspectral imaging detection system according to claim 9, wherein a window of the HgCdTe detector (4-3) is coated with a layer of front cut-off filter coating with a wavelength of $\lambda_5$.

14. The solar reflection full-band hyperspectral imaging detection system according to claim 1, wherein a positive first-order diffraction efficiency is adopted for fine beam splitting through the convex diffraction grating of the first spectrometer (3-1), the second spectrometer (3-2), and the third spectrometer (3-3).

15. The solar reflection full-band hyperspectral imaging detection system according to claim 1, wherein a window of the CMOS detector (4-1) is coated with a layer of rear cut-off filter coating with a wavelength of $\lambda_2$.

16. The solar reflection full-band hyperspectral imaging detection system according to claim 1, wherein a window of the InGaAs detector (4-2) is coated with a layer of front cut-off filter coating with a wavelength of $\lambda_3$.

17. The solar reflection full-band hyperspectral imaging detection system according to claim 1, wherein a window of the HgCdTe detector (4-3) is coated with a layer of front cut-off filter coating with a wavelength of $\lambda_5$.

* * * * *